United States Patent [19]

Leung et al.

[11] Patent Number: 5,864,840
[45] Date of Patent: Jan. 26, 1999

[54] EVALUATION OF EXISTENTIAL AND UNIVERSAL SUBQUERY IN A RELATIONAL DATABASE MANAGEMENT SYSTEM FOR INCREASED EFFICIENCY

[75] Inventors: Ting Yu Leung, San Jose, Calif.; Alex Chak-tsang Lui, Kowloon, Hong Kong; Mir Hamid Pirahesh; Tuong Chanh Truong, both of San Jose, Calif.

[73] Assignee: International Business Machines Corporation, Armonk, N.Y.

[21] Appl. No.: 884,697

[22] Filed: Jun. 30, 1997

[51] Int. Cl.⁶ .................................................. G06F 17/30
[52] U.S. Cl. .................................................. 707/2; 707/10
[58] Field of Search ............................. 707/1–5, 10, 101, 707/205

[56] References Cited

U.S. PATENT DOCUMENTS

| | | | |
|---|---|---|---|
| 5,325,525 | 6/1994 | Shan et al. | 395/674 |
| 5,367,675 | 11/1994 | Cheung et al. | 707/2 |
| 5,544,355 | 8/1996 | Chaudhuri et al. | 707/2 |
| 5,548,755 | 8/1996 | Leung et al. | 707/2 |
| 5,590,324 | 12/1996 | Leung et al. | 707/5 |
| 5,659,725 | 8/1997 | Levy et al. | 707/3 |
| 5,742,806 | 4/1998 | Reiner et al. | 707/3 |
| 5,745,746 | 4/1998 | Jhingran et al. | 707/2 |

OTHER PUBLICATIONS

"DB2 Parallel Edition",C. K. Baru et al., *IBM Systems Journal*, vol. 34, No. 2, 1995, pp. 292–322.

"The Case for Shared Nothing", M. Stonebraker, pp. 4–9, No Date.

"Extensible/Rule Based Query Rewrite Optimization in Starburst", H. Pirahesh et al., *ACM SIGMOD*, 1992, pp. 39–48.

"The Gamma Database Machine Project", D. DeWitt et al., *IEEE Transactions On Knowledge and Data Engineering*, vol. 2, No. 1, Mar. 1990, pp. 44–62.

*Primary Examiner*—Maria N. Von Buhr
*Attorney, Agent, or Firm*—Gray Cary Ware & Freidenrich

[57] ABSTRACT

A relational data base management system includes a query processor that permits consideration of alternative query plans by the query optimizer so one table can be sent to a selected network location for subquery evaluation in consideration of maximum processing efficiency. Subqueries are converted from "predicate push-down" form to scalar subqueries, enabling upper tables to be sent to nodes of lower tables and vice versa, thereby permitting selection of the node direction depending on the least cost alternative. The optimizer of the query processor is presented with rewritten query code that permits more than one alternative for sending tables for evaluation. The optimizer evaluates the alternatives permitted by the rewritten code, determines the optimal plan for each alternative, and selects the least-cost plan from among the plans evaluated. Thus, the optimizer can decide to send an outer table to where a subquery table is located, or can decide to send a subquery table to where an outer table is located, depending on which is more efficient.

90 Claims, 5 Drawing Sheets

EVALUATION OF EXISTENTIAL AND UNIVERSAL SUBQUERY IN A RELATIONAL DATABASE MANAGEMENT SYSTEM FOR INCREASED EFFICIENCY

BACKGROUND OF THE INVENTION

1. Field of the Invention

This invention relates generally to database management systems and, more particularly, to efficient evaluation of subqueries in SQL statements processed in relational database management systems.

2. Description of the Related Art

Information is frequently stored in computer processing systems in the form of a relational database. A relational database stores information as a collection of tables having interrelated columns and rows. A relational database management system (RDBMS) provides a user interface to store and retrieve the information and provides a query methodology that permits table operations to be performed on the data. One such RDBMS interface is the Structured Query Language (SQL) interface, which is specified by standards adopted by the American National Standards Institute (ANSI) and the International Standards Organization (ISO) following original development work by the International Business Machines (IBM) Corporation. The SQL interface permits users to formulate operations on the data tables either interactively, or through batch file processing, or embedded in host languages such as C, COBOL, or the like.

In particular, SQL provides table operations with which users can request database information and form one or more new tables out of the operation results. Data from multiple tables, or views, can be linked to perform complex sets of table operations with a single statement. The table operations are specified in SQL statements called queries. One typical SQL operation in a query is the "SELECT" operation, which retrieves table rows and columns that meet a specified selection parameter. Another operation permitted by SQL is the "JOIN" operation, which concatenates all or part of two or more tables to create a new resulting table. For example, a query might produce a table that contains the names of all supervisory employees who live in a given city, and might do so by specifying a SELECT operation to retrieve employee names and resident cities from one table, and then performing a JOIN of that data after a SELECT operation to retrieve employee names and job titles from another table.

Evaluation of SQL Statements

An SQL query generally includes at least one predicate, which is an SQL expression that can assume a logical value of TRUE, FALSE, or UNKNOWN. A predicate typically either specifies a data range, tests for an existence condition, tests for equivalence, or performs a similar table comparison operation. SQL queries and their resulting table operations can be nested through several levels of predicates such that a higher nested predicate, or level of operation, cannot be evaluated until after a lower level predicate, or operation, has been evaluated. A lower level of SQL operation in an SQL statement is generally referred to as a subquery.

Nested SQL statements may require tuple-by-tuple data manipulation in each subquery for evaluation of the complete statement. For example, each entry of a table column may need to be compared against each entry of a corresponding column in another table to determine if a SELECT operation should retrieve a table row. Such tuple-by-tuple operations are very inefficient. This is especially so in the case of computer systems implemented as so-called massively parallel processing (MPP), shared-nothing systems. In an MPP system, many different processors are linked together across a local area network (LAN). Each processor comprises a node of the MPP network and each processor includes local memory and one or more data storage devices. An RDBMS that is maintained on an MPP system could require much inter-node communication to evaluate a query that involves many tables that are stored at different nodes across the network. Even a query that involves a single table still can require inter-node communication, because parts of the single table sometimes are located on different nodes. The different parts of the table must be collected at a single node for comparison and selection operations. In general, a data set is a collection of data that is available locally at a single node. It should be clear that SQL operations carried out on sets of data are much more efficiently performed as compared to tuple-by-tuple evaluation of data.

In an SQL system, queries are received by the SQL interface and are rewritten in an SQL processor from the input format provided by the user into generally standard SQL language. The SQL processor is sometimes implemented as an SQL compiler. To evaluate the query, an SQL execution plan is generated by the SQL processor from the rewritten SQL code and is provided to an SQL optimizer, which determines the best implementation of the execution plan. The SQL optimizer can choose, for example, from among alternative combinations of SQL operators to implement an execution plan more efficiently.

SQL Subquery Evaluation

One inefficiency involved in correlated subquery evaluation occurs when a higher level query involves a table T, called an outer table, and a lower level subquery involves a table S, called a lower table, and the tables are located at two different network nodes partitioned across different network nodes. Conventionally, the query evaluation is performed so that the outer table T from the higher level query is sent to the node where the subquery lower table S is stored, so that the lower level subquery is evaluated before the higher level query is evaluated. In this way, the results of lower level subqueries are used in the evaluation of higher level subqueries. The SQL optimizer generally can determine the combination of alternative SQL operators that can be used for implementation of the execution plan, but the SQL optimizer does not conventionally have a choice as to which network nodes any subquery predicates will be sent. As noted above, this type of subquery evaluation is frequently performed one tuple at a time. As a result, the outer table T is typically sent to the lower table S even if table S is much smaller in size than table T.

More particularly, the SQL query described immediately above might be represented by the following SQL query:

---
Query 1
---
SELECT *
FROM T
WHERE
 . . . (T.C1 IN (SELECT S.C1 FROM S WHERE T.C2=S.C2)) . . .

---

Without loss of generality, it is assumed that all NOT operators in the WHERE clause have pushed down using well-known techniques in this example as well as in all other examples used in the preferred embodiment. This query (Query 1) calls for selection of all tuples from the table T where the first column in table T (T.C1) matches the first column in table S (SELECT S.C1 FROM S) for those rows in which the second column in table T matches the second column in table S (WHERE T.C2=S.C2). The parenthetical clause in the last line of Query 1 is known as a correlated subquery. A possible execution plan for Query 1 may be given by the following pseudo-code table:

| Pseudo Code Table 1 |
| --- |
| In each table T partition;<br>  For each tuple in each table T partition, send the correlation value (T.C2) to the processors where table S resides and evaluate the subquery "SELECT S.C1 FROM S WHERE T.C2=S.C2" remotely (that is, send table T tuples to the nodes where the table S tuples reside),<br>  Upon receiving a set of rows from the processors where the table S resides and the subquery "SELECT S.C1 FROM S WHERE T.C2=S.C2" is evaluated, the subquery predicate is evaluated if T.C1 matches any of the rows received via evaluating the subquery condition "T.C1=S.C1". If there is a match, the table T tuple is returned to the user. |

The evaluation of the subquery above may involve scanning a partition of table S via an index or via a table scan. The result of the subquery evaluation, (S.C1), is a set of rows, and is returned to the originator of the correlation value.

Thus, the table T tuples are sent to the nodes where the table S tuples are stored, for evaluation of the subquery. The potential inefficiency of this conventional SQL processing may be illustrated by considering the case where the table S is much smaller than the table T. The table T tuples will be sent to the locations of the table S tuples, because the table T tuples are the outer table and the table S tuples are the lower table. So table T is potentially sent tuple by tuple, with comparisons performed at many different nodes, even though it would undoubtedly be more efficient for table S to be sent to the relatively fewer number of nodes for table T, where the requisite comparisons would be performed.

From the discussion above, it should be apparent that there is a need for a relational database management system that efficiently evaluates complex subquery statements. The present invention fulfills this need.

SUMMARY OF THE INVENTION

The present invention provides efficient subquery evaluation in a relational database management system by permitting the query processor to consider alternative query plans before selecting where to send one table to another for subquery evaluation. More particularly, the optimizer of a query processor is enabled for considering more than one alternative for sending tables for evaluation. In accordance with standard system evaluation routines, the optimizer evaluates the alternative execution plans, determines the optimal plan for each alternative, and selects the least-cost plan from among the plans evaluated. In this way, the optimizer can decide to send an outer table to where a subquery table is located, or can decide to send a subquery table to where an outer table is located, depending on which is more efficient. This increases subquery evaluation efficiency.

In another aspect of the invention, the query processor performs a predicate push-down operation to convert an existential or universal subquery, such as subqueries having either "=ANY" or "=ALL", respectively, using an EXISTS predicate. A subquery with an EXISTS predicate can be evaluated more efficiently than the subquery in the original form, especially in the MPP environment, because: (1) the EXISTS predicate does not require returning any user data values and thus it is sufficient to return an indicator of a tuple existence from the subquery, thereby reducing the communication overhead; and (2) the subquery need not return multiple tuple existence indicators when there are multiple matches because the EXISTS predicate is insensitive to duplicates, and thus the subquery can return only one tuple existence indicator when there are multiple matches. As soon as there is a match, the subquery can return a tuple indicator and stop the current subquery evaluation. Hence, an early-out capability is exploited.

To permit considering different alternatives of tuple sending for processing, the query processor can transform the converted query into what is known as a scalar subquery, taking advantage of the fact that a scalar subquery can be processed like a join operation. To perform these tasks, the query processor operates specially on two types of subqueries. The first type of subquery is the "existential" subquery having predicate quantifiers such as "IN" and "=ANY". In such a case, the query processor pushes the subquery predicate from the query down to the subquery level, resulting in an EXISTS predicate, and then transforms the existential subquery into a scalar subquery, thereby generating table-sending alternatives. The rewritten and transformed subquery is provided to the query optimizer for selection from among the alternatives. The second type of subquery specially processed by the query processor is the "universal" subquery having predicate quantifiers such as "=ALL". For such a universal subquery, the query processor pushes the subquery predicate down to the subquery level resulting in a "NOT EXISTS" predicate, and then transforms the universal subquery into a scalar subquery, thereby generating table-sending alternatives. In all cases, the optimizer advantageously considers the scalar subqueries and is then free to select the most efficient query plan for execution.

Other features and advantages of the present invention should be apparent from the following description of the preferred embodiment, which illustrates, by way of example, the principles of the invention.

DESCRIPTION OF THE PREFERRED EMBODIMENTS

Figure 1:
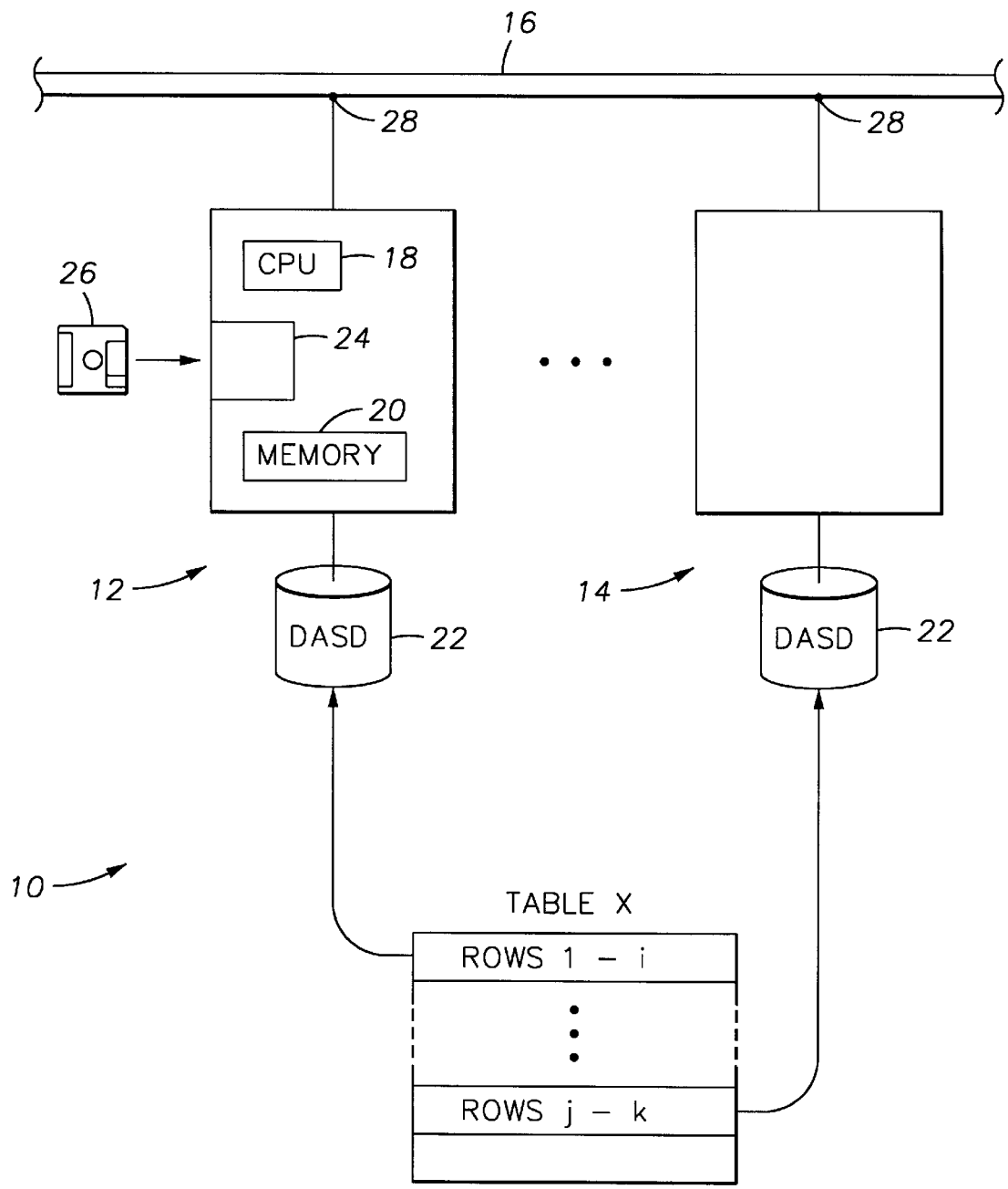
FIG. 1 is a representation of a computer network system constructed in accordance with the present invention.

FIG. 1 illustrates an exemplary computing system 10 constructed in accordance with the present invention. The system includes multiple computers, two of which 12, 14 are shown, connected to a communication network 16 in a massively parallel processing (MPP) shared-nothing configuration. Each of the computers 12, 14 has a similar construction, so that details described with respect to one computer will be understood to apply to all computers of the system. Each computer includes a central processing unit (CPU) 18, an operating main memory 20, and a local direct access storage device (DASD) 22, such as a disk drive. Each computer communicates with the others via the network 16, thereby comprising a network node.

The DASD units 22 of each computer contain table data that comprises a relational database management system (RDBMS). An application program provides an RDBMS interface to the users and can reside in each computer 12, 14 or can be installed on a single file server computer of the network. In either case, data files of the RDBMS are distributed across the DASD units of the network. Thus, a Table X of the RDBMS shown in FIG. 1 having multiple rows is stored across the computers of the network 16 such that rows 1 through i, for example, are stored in DASD of the first computer 12, rows j through k are stored in DASD of the second computer 14, and the remaining rows are stored in other computers (not illustrated). In this way, each table is stored across a set of the network nodes.

In the preferred embodiment, the RDBMS interface comprises an SQL system stored in operating memory 20 of each machine. A user at a computer of the network 16 can pose a query for solution by an SQL query processor of the RDBMS. In the "DB2 Common Server Version 2" product from International Business Machines (IBM) Corporation, scalar subqueries are treated as derived tables allowing them to appear as operands of joins. Such derived tables return either a null-valued tuple when the computation of the subquery results in an empty answer set or one tuple, which is the computation result of the subquery. In accordance with the invention, subqueries can be converted into a scalar subquery and hence, for the rewritten SQL code, the query processor can consider alternatives wherein the main query tables are sent to the nodes where subquery tables reside, or vice versa. The query optimizer evaluates the table sending alternatives permitted by the rewritten SQL code by determining their resource cost, determines the optimal plan for each alternative, and selects the least-cost plan from the plans evaluated. In this way, the optimizer can decide to send an outer table to the node where a subquery inner table is located, or can decide to send a subquery table to where an outer table is located, depending on which is more efficient. Without the techniques in the present invention, the query optimizer is restricted to sending tuples from the outer table to the subquery tables.

a. Network Configuration

Each computer CPU 18 performs its functions by executing instructions stored in the operating memory 20. The instructions can be received through an optional storage drive 24 or through an interface with the network 16. The storage drive permits a program product storage device 26 to be received and for program steps recorded on the program product storage device to be read and transferred into the operating memory 20. In this way, the processing steps necessary for operation in accordance with the invention can be embodied on a program product. Those skilled in the art will appreciate that the program products can comprise machine-readable storage devices 26 such as magnetic media disks on which are recorded program instructions whose execution implements the RDBMS of the present invention. The storage devices 26 also can comprise, for example, media such as optical disks and other machine-readable storage devices. Other suitable program product storage devices can include magnetic tape and semiconductor memory. Alternatively, the program steps can be received into the operating memory 20 from the DASD 22, or over the network 16. In the latter method, the computer system also includes a network interface 28 that permits communication between the CPU 18 at the first node 12 and other computer systems 14 over the network 16. In that way, the computer system 12 can receive data into the main memory 20 through the interface 28 after network communication has been established by well-known methods that will be understood by those skilled in the art without further explanation.

b. RDBMS Configuration

Figure 2:
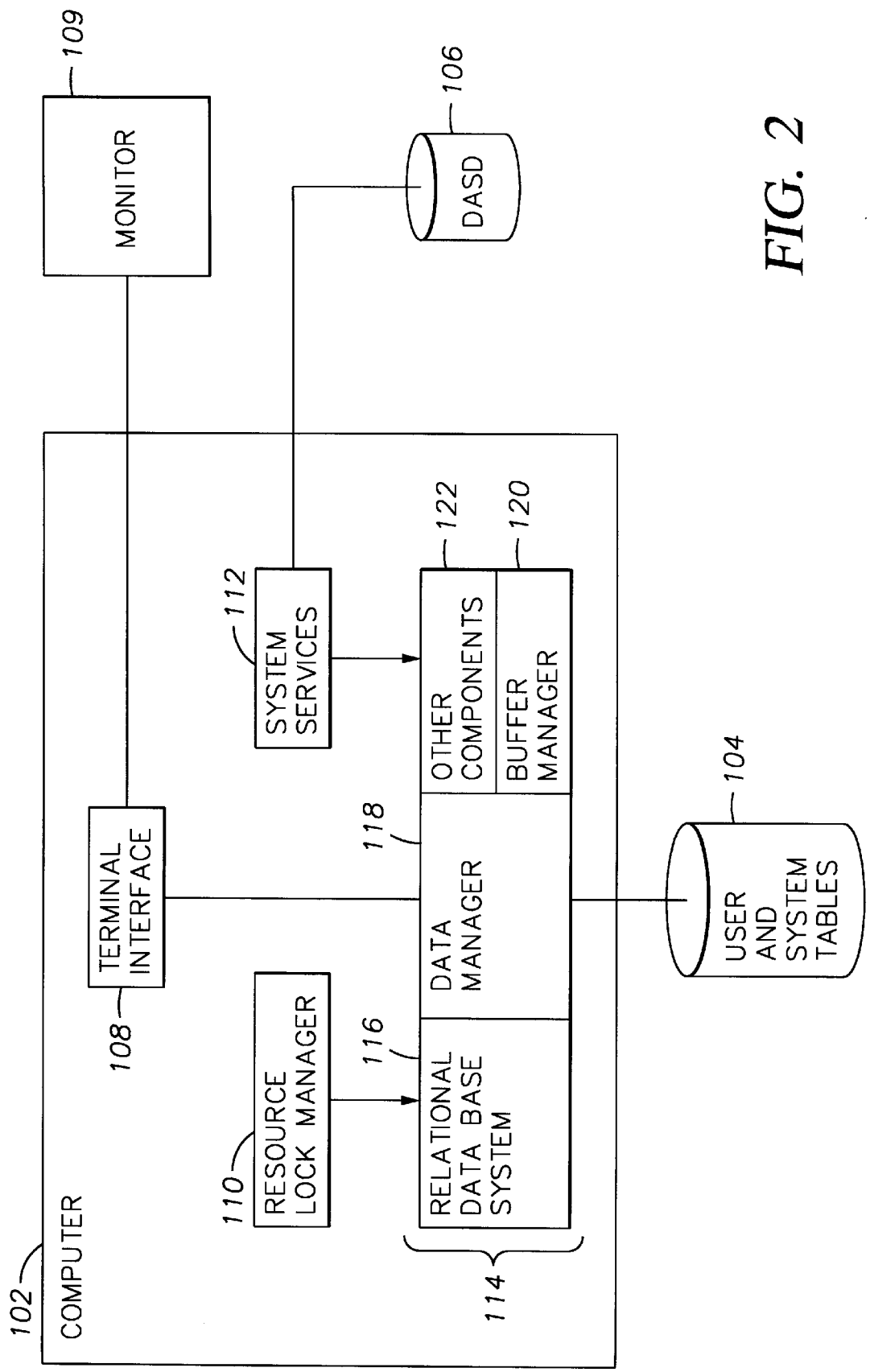
FIG. 2 is a representation of a computer processing system at a node of the FIG. 1 network that implements a relational data base management system in accordance with the present invention.

FIG. 2 illustrates a computer environment at a node 12 (see FIG. 1) of the exemplary RDBMS computing system. In the exemplary computer environment, a computer system 102 at the node accesses network data storage devices, such as disk drives, in which are stored user and system tables 104 and log data tables 106. An operator of the computer system 102 uses a standard operator terminal interface 108, such as one of the interfaces known as IMS/DB/DC, CICS, TSO, OS/2, or some other appropriate interface, to transmit electrical signals to and from the computer system that represent commands for performing various search and retrieval functions against the databases 104, 106. The commands are viewed on a visual monitor 109. These search and retrieval functions are generally referred to as queries. In the preferred embodiment of the present invention, these queries conform to the SQL standard interface, and invoke functions performed by RDBMS software. In the preferred embodiment of the present invention, the RDBMS software comprises the "DB2" product offered by the IBM Corporation for the "MVS", "AIX", or "OS/2" operating systems. Such software generally resides in memory of network-based computers. Those skilled in the art will recognize that the present invention has application to any RDBMS software that uses SQL, and may similarly be applied to non-SQL queries.

As illustrated in FIG. 2, the DB2 product architecture for the MVS operating system includes three major components: the Resource Lock Manager ("RLM") 110, the System Services module 112, and the Database Services module 114. The RLM handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing the log data sets 106, gathering system statistics, handling startup and shutdown operations, and providing management support.

At the center of the DB2 product architecture is the Database Services Processor module 114. The Database Services Processor module contains several submodules, including the Relational Database System (RDS) 116, the Data Manager 118, the Buffer Manager 120, and other database components 122, including an SQL compiler/ interpreter. These submodules support the functions of the SQL language, such as definitions, access control, retrieval, and update of user and system data. The Database Services Processor module 114 preferably comprises one or more processors that execute a series of computer-executable programming instructions. These programming instructions preferably reside in storage locations such as fast-access memory 20 (see FIG. 1) of the computer 102. Alternatively, the instructions may be stored on a computer diskette 26 (FIG. 1), direct access storage device, magnetic tape, conventional "hard drive", electronic read-only memory, optical storage device, paper punch cards, or another suitable data storage medium containing logically segmented storage locations.

As noted above, and in accordance with the present invention, the SQL query processor component of the RDBMS will respond to submission of a user query by providing the SQL optimizer with rewritten SQL code that permits selecting from multiple execution plans to send query tuples to more than one alternative node for evaluation. After the optimizer receives the rewritten SQL code, conventional optimizer selection techniques can be applied to select the most efficient alternative. That is, an SQL optimizer is conventionally provided with system information such as the location of tables and parts of tables, the size of such tables, network node locations, system operating characteristics and statistics, and the like. In the preferred embodiment, such query processing can take place in either an interactive operating mode or in a batch processing mode, both of which will be described next.

c. Interactive SQL Execution

Figure 3:
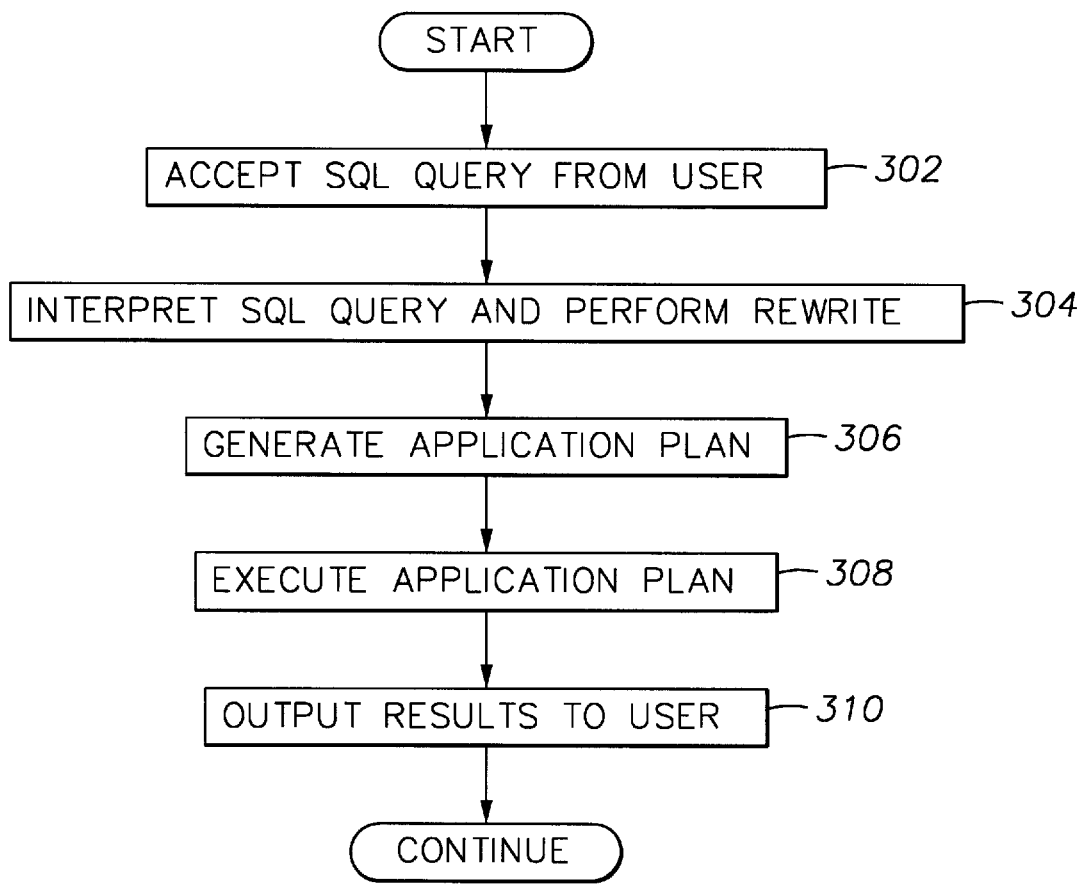
FIG. 3 is a flow diagram that illustrates the processing steps executed by the computer processing system of FIG. 2 to interpret and execute an SQL statement in an interactive environment.

FIG. 3 is a flow diagram that illustrates the operating steps necessary for the interpretation and execution of SQL statements in an interactive network environment such as shown in FIG. 1, in accordance with the present invention. These steps are implemented as computer program steps stored in one of the network computers 12, 14. The first flow diagram box of FIG. 3, numbered 302, represents the input of an SQL statement into the computer system from the user. The next flow diagram box 304 of FIG. 3 represents the step of compiling or interpreting the received SQL statement. In the preferred embodiment, this step includes an optimization function that rewrites and transforms the SQL query in a manner described in greater detail below. The FIG. 3 flow diagram box numbered 306 represents the step of generating a compiled set of runtime structures called an application plan from the compiled SQL statements.

Generally, the SQL statements received as input from the user (step 302) specify the data the user wants, in the form of a query, but do not specify how to get it. The application plan represents the computer-generated sequence of operations to obtain the data specified by the user query. Generation of the application plan involves consideration of both the available access paths (indexes, sequential reads, etc.) and system held statistics on the data to be accessed (the size of the table, the number of distinct values in a particular column, etc.), to choose what the RDBMS processor considers to be the most efficient access path for the query. The selection of the most efficient access path utilizes query, database, and system information that is conventionally available to SQL optimizers. The FIG. 3 flow diagram box numbered 308 represents the execution of the application plan. The last block 310 in FIG. 3 represents the output of the results of the application plan to the user.

d. Embedded/Batch SQL Execution

Figure 4:
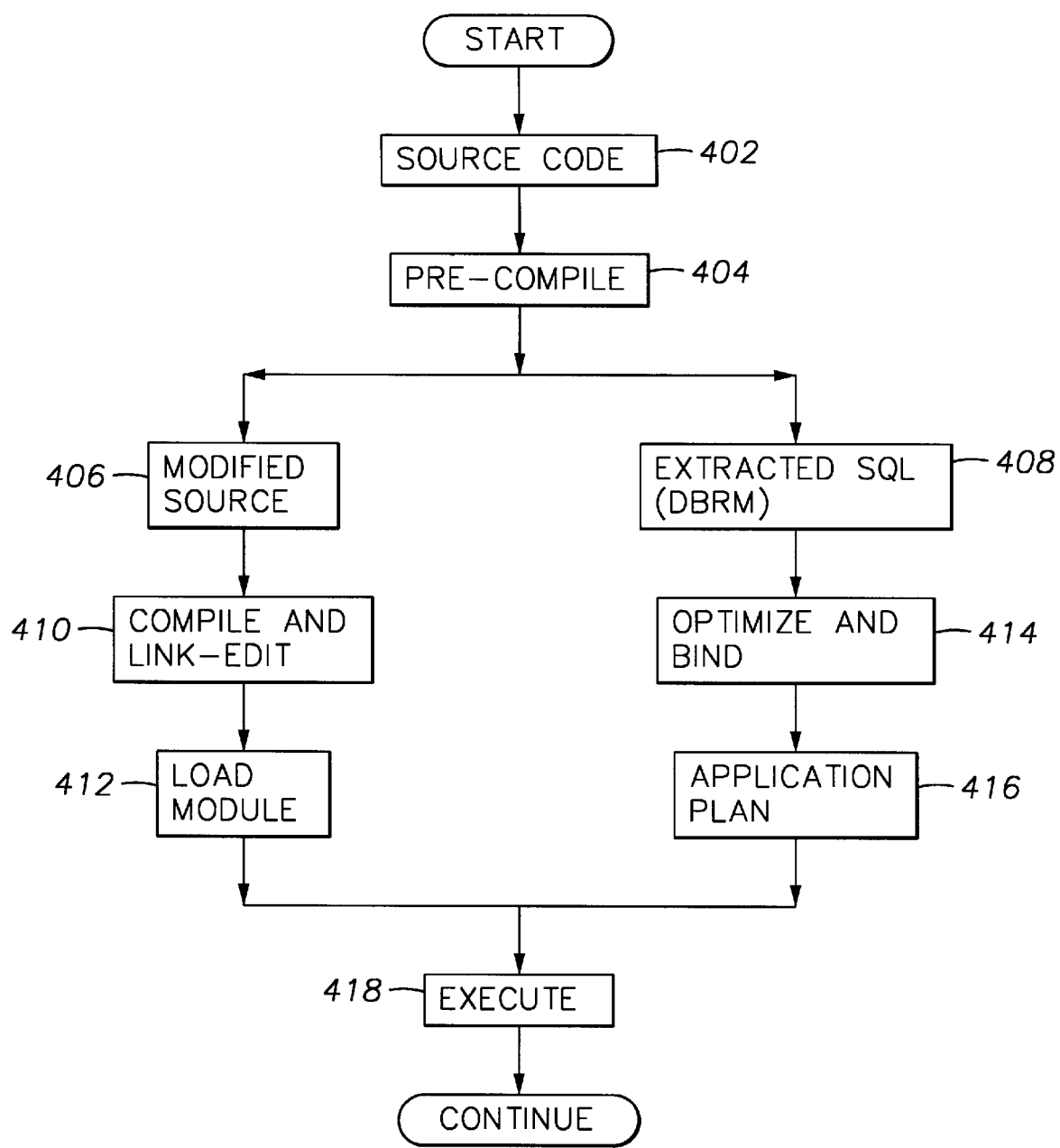
FIG. 4 is a flow diagram that illustrates the processing steps executed by the computer processing system of FIG. 2 to interpret and execute an SQL statement embedded in source code.

FIG. 4 is a flow diagram that illustrates the steps necessary for the interpretation and execution of SQL statements embedded in source code for batch operation according to the present invention. The first block 402 represents program source code containing a host language (such as COBOL or C) and embedded SQL statements that is received by the RDBMS processor for batch processing. The received program source code is next subjected to a pre-compile step 404. There are two types of output code from the pre-compile step 404: a modified SQL source module 406 and a Database Request Module ("DBRM") 408. The modified SQL source module 406 contains host language calls to the DB2 program, which the pre-compile step 404 inserts into the pre-compile output code in place of the SQL source statements. The other output of the pre-compile step, the DBRM 408, consists of the SQL statements from the program source code 402.

After the modified source 406 is produced, a compile and link-edit step 410 uses the modified source output to produce a load module 412, while an optimize and bind step 414 uses the DBRM output 408 to produce a compiled set of runtime structures for the application plan 416. As indicated above in conjunction with the description of FIG. 3, the SQL statements from the program source code 402 specify only the data that the user wants, but not how to get to it. In the preferred embodiment, the optimize and bind step 414 optimizes the SQL query in a manner described in greater detail below. The optimize and bind step then considers both the available access paths (indexes, sequential reads, etc.) and system held statistics on the data to be accessed (the size of the table, the number of distinct values in a particular column, etc.), to choose what it considers to be the most efficient access path for the query. The load module 412 and application plan 416 are then executed together at the last step, represented by the flow diagram box numbered 418.

e. Optimization in Accordance With the Invention

In accordance with the invention, the RDBMS processor (FIG. 2) processes existential subqueries and universal subqueries so as to convert the respective subqueries into scalar subqueries and permit the RDBMS optimizer to choose which table will be sent to which node for evaluation. In this way, selection of the least cost execution plan for evaluation is assured. In another aspect of the invention, the RDBMS processor converts a universal subquery into a scalar subquery by determining whether the predicate being pushed down in nullable or not nullable, as explained below.

Figure 5:
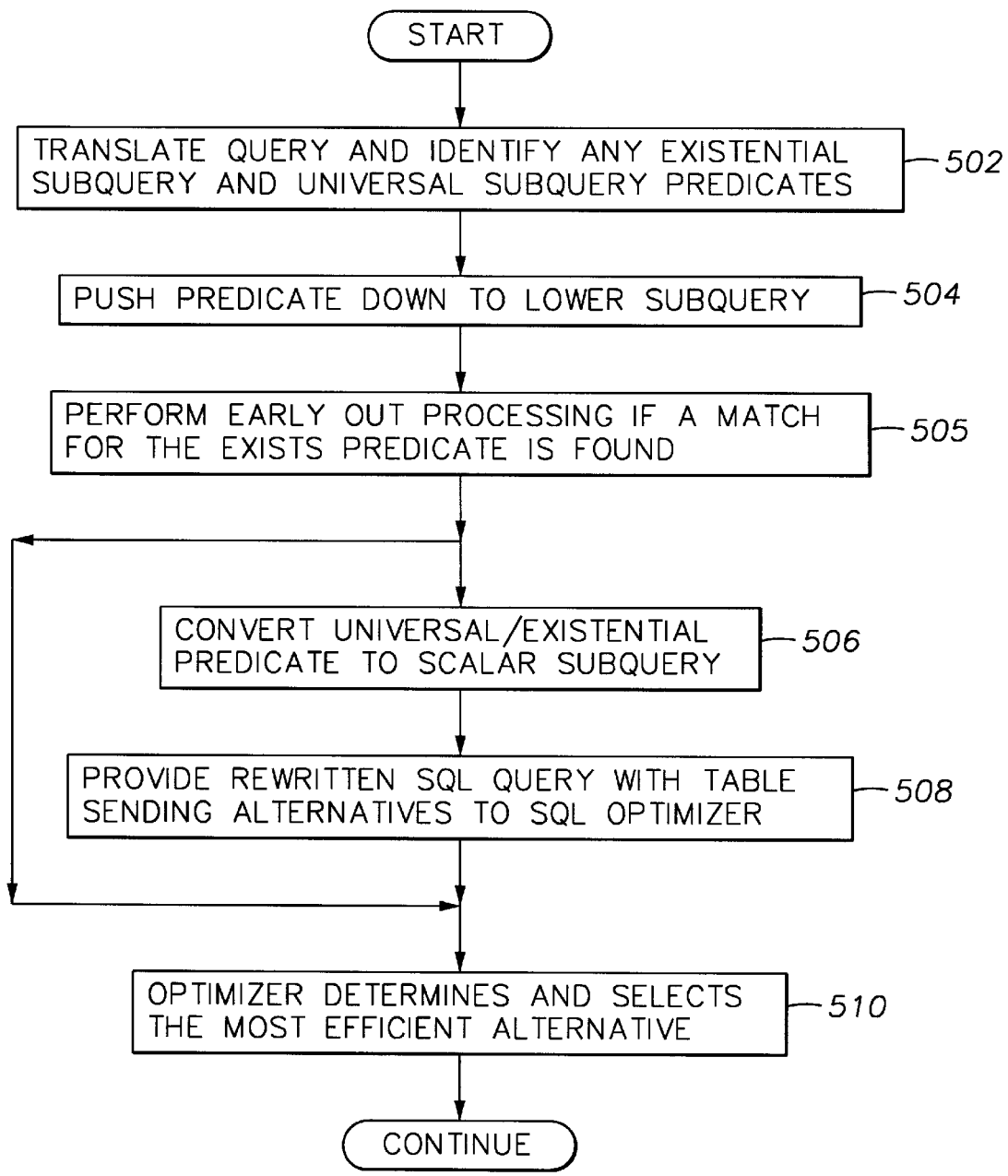
FIG. 5 is a flow diagram that illustrates the processing steps executed by the computer processing system of FIG. 2 to optimize the SQL query in accordance with either the FIG. 3 interactive processing or the FIG. 4 batch processing.

FIG. 5 is a flow diagram that represents the predicate pushdown processing steps performed by the SQL processor of the invention. In particular, FIG. 5 represents the processing steps performed in the optimization step of FIG. 3 (box 304) and of FIG. 4 (414). In the first step of FIG. 5, illustrated by the flow diagram box numbered 502, the query is translated into one or more query blocks having representations of queries and subqueries. In this step, the processor may also identify existential subqueries and universal subqueries for processing, as described in greater detail below. The flow diagram box numbered 504 represents the operation of pushing the predicate down to the subquery level. An "early out" processing step is performed next, as indicated by the flow diagram box numbered 505. This step, described further below, checks for the first match with an "exists" predicate, whereupon an "early out" indicator is returned so that further match checking can be halted. The result of the early out processing step is returned to both a conversion step (box 506) and an optimizer selection step (box 510). The processing step represented by the box numbered 506 converts the subquery with pushed predicate to a scalar subquery, thereby producing a subquery that permits table-sending alternatives during optimization. At the box numbered 508, the processor provides the rewritten SQL query, with the table-sending alternatives, to the processor optimizer. At the flow diagram box numbered 510, the optimizer receives an early out indication if an "exists" predicate match was found and also receives the rewritten scalar subquery, and then selects the most efficient (least cost) of these alternative query plans for execution. The SQL processor then continues operation.

The processing illustrated in FIG. 5 is performed on queries relating to existential operators and queries relating to universal queries, as described further below.

i. The existential subquery

An existential query is a query that inquires whether a specified data arrangement exists within the database. The invention permits conversion of such a query into two converted forms, after which the optimizer can make a decision as to which is more efficient in terms of table-sending alternatives. In particular, the preferred embodiment of the present invention operates on a SELECT query to push down predicates, following the user input step described above in conjunction with FIGS. 3 and 4. For example, consider again the SQL query from above called "Query 1" as a user-provided input:

| Query 1 |
|---|
| SELECT * <br> FROM T <br> WHERE <br> ... (T.C1 IN (SELECT S.C1 FROM S WHERE T.C2=S.C2)) . . .; |

The conversion to scalar subquery in accordance with the invention first "pushes" the subquery condition to the next level, as follows:

| Converted Query 1 Following Predicate Push-Down |
|---|
| SELECT * <br> FROM T <br> WHERE <br> ... (EXISTS (SELECT 1 <br>     FROM S <br>     WHERE T.C2=S.C2 AND T.C1=S.C1)). . .; |

For the subquery predicate T.C1=S.C1 (table T is sent to table S, tested for whether the first column of T is the same as the first column of S), if the original query returns a non-null S.C1 column entry, then the EXISTS predicate is true, else it is false. If the subquery returns one or more null S.C1 column entries, then the EXISTS predicate is false, and if the subquery returns the empty set, then the EXISTS predicate also is false. Notice that the opposite subquery is not equivalent: for S.C1=T.C1 (table S sent to table T): if S.C1=T.C1 returns a non-null, then the EXISTS predicate is true; if the equivalency returns an empty set, then the EXISTS predicate is false.

The above converted query is more efficient to evaluate than Query 1, especially in the MPP environment, because the subquery need not return column values (S.C1 in Query 1) to the main query for the subquery predicate evaluation. For the EXISTS predicate in the preferred embodiment, a tuple existence indicator is optionally returned by the subquery as soon as there is a match, and thus less communication overhead is incurred. Furthermore, because the EXISTS predicate is insensitive to duplicates, the subquery can return only one tuple existence indicator even when there are multiple matches, and thus the subquery processing can terminate upon finding the first match. That is, as soon as there is a match and the EXISTS predicate is shown to be true, no further processing for the EXISTS predicate need be performed. This is the processing represented by the FIG. 5 flow diagram box numbered 505. In this way, the query processor provides an early-out capability for more efficient operation. It should be noted that the processing of box 505 is performed and results are provided to the optimizer (at box 510) with (boxes 506, 508) and without the conversion of the subquery to a scalar subquery. The optimizer thereby has a plurality of query plan alternatives from which to choose, and will therefore process queries with greater efficiency.

The second processing step in accordance with the present invention for converting to a scalar subquery results in the following:

| Converted Query 1 After Scalar Subquery Transformation |
|---|
| SELECT * <br> FROM T <br> WHERE <br> ... (1 = (SELECT DISTINCT 1 <br>     FROM S <br>     WHERE T.C2=S.C2 AND T.C1=S.C1)). . .; |

In the "Converted Query 1 Following Predicate Push-Down" query above, the query is in the form of a counting quantifier predicate. As a result, the SQL optimizer has potentially many restrictions as to when it can apply the subquery, which usually is applied as soon as possible. A typical execution plan for this type of converted subquery is to send T tuples, one at a time, to the S sites. Each S site will return either a "1" or a null, and the originator node of the T tuple will collect all returned results and apply the subquery predicate. Under such a scenario, the optimizer will be unable to generate an execution plan that sends S tuples to the T sites for execution.

The invention recognizes the more efficient possibilities presented by making the second conversion shown above. In the "Converted Query 1 After Scalar Subquery Transformation" query above, the SQL optimizer can send T tuples to S table sites for execution or can send S tuples to T table sites for execution. The optimizer of the preferred embodiment will determine if the T table is a very large table compared with the S table, and in response will send the S tuples to the T table sites for execution, gaining greater efficiency. If the optimizer determines that the S table is very large compared to the T table, then it will respond by sending the T tuples to the S table sites for execution. This processing is represented by the flow diagram box numbered 510.

As noted, the first conversion step in evaluating a query is generally referred to as pushing the predicate condition down to a lower subquery, and the second step is a transformation of the query into a scalar subquery. In general then, the processing represented by the FIG. 5 processing is to perform predicate pushdown processing (the FIG. 5 flow diagram box numbered 504) and then to transform to a scalar subquery (flow diagram box numbered 506). These operations may be summarized follows, beginning with being applied to a source existential query that has the form:

| Existential Subquery Source |
|---|
| SELECT * <br> FROM T1 Q1 <br> WHERE |

-continued

Existential Subquery Source

```
...  C1 relop (SELECT C1
        FROM T2 Q2
        WHERE Q1.C2 = Q2.C2))...;
``` where "relop" is a relational operator, such as EQUAL, NOT EQUAL, LESS THAN, GREATER THAN, LESS THAN/EQUAL, GREATER THAN/EQUAL, where T1 and T2 represent database tables, and where C1 and C2 represent respective columns of those tables. After predicate pushdown (box 504), the converted query is:

Converted Existential Ouery After Predicate Push-Down

```
SELECT *
FROM T1 Q1
WHERE
    ...  (EXISTS (SELECT 1
        FROM T2 Q2
        WHERE Q1.C2 = Q2.C2 AND Q1.C1 relop Q2.C1))...;
``` where "relop", T1, T2, C1, and C2 are as defined above. After predicate pushdown, the converted query is subjected to a transformation processing in accordance with the invention (box 506), which produces a scalar query as follows, such that table-sending alternatives may be considered by the SQL optimizer:

Converted Existential Query After Scalar Transformation

```
SELECT *
FROM T1 Q1
WHERE
    ... (1 = (SELECT DISTINCT 1
        FROM T2 Q2
        WHERE Q1.C2 = Q2.C2 AND Q1.C1 relop Q2.C1))...;
```

The query expressions above are general expressions for the existential query conversion processing performed by the SQL processor of the preferred embodiment. Note that the above transformations can be done independently of any predicate in the subquery ("Q1.C2=Q2.C2" in the above example).

ii. The universal subquery

A universal subquery is a subquery that involves a quantified predicate, such as "ALL", that compares a data value against all rows produced by a subquery. For example, consider the universal subquery illustrated in Query 2 as follows:

Query 2

```
SELECT *
FROM T
WHERE
    ... (T.C1=ALL (SELECT C1 FROM S WHERE T.C2=S.C2))...;
```

In Query 2, the value of column C1 of each row in Table T is compared against each corresponding row produced from the SELECT clause, and a single value is returned that describes the result of the entire set of comparisons. That is, if the SELECT subquery returns a non-null S.C1, then the WHERE . . . ALL statement is true if and only if the statement "C1=all C1" is true. If the subquery returns one or more null S.C1 entries, then the WHERE . . . ALL statement is false. Lastly, if the subquery returns an empty set, then the WHERE . . . ALL statement is true. In accordance with the present invention, the universal subquery can be transformed into either one of two cases, depending on whether the S.C1 and T.C1 entries are nullable or not nullable.

If both S.C1 and T.C1 are not nullable, then predicate pushdown processing transforms Query 2 into the following rewritten SQL:

Converted Universal Query 2--Not Nullable

```
SELECT *
FROM T
WHERE
    ...  (NOT EXISTS (SELECT 1 FROM S
        WHERE T.C2=S.C2 AND T.C1<>S.C1))...;
```

The column entry T.C1 must be non-nullable because if T.C1 is null, then the subquery returns an empty set and therefore the subquery predicate will always be true.

If either S.C1 or T.C1, or both, are nullable, then predicate pushdown processing transforms Query 2 into:

Converted Universal Query 2--Nullable

```
SELECT *
FROM T
WHERE
    ...  NOT EXISTS (SELECT 1
        FROM S
        WHERE T.C2=S.C2 AND
        0=CASE WHEN T.C1=S.C1 THEN 1
        ELSE 0 END))...;
```

This is a valid transformation because if there is a null in the column S.C1, then the subquery returns a tuple and thus the NOT EXISTS statement is false. Taking the nullable case as an example, the SQL processor in accordance with the invention next transforms the converted query into a scalar subquery as follows:

Converted Nullable Universal Query 2 After Scalar Subquery Transformation

```
SELECT *
FROM T
WHERE
    ... (SELECT DISTINCT 1
        FROM S
        WHERE T.C2=S.C2 AND
        0=CASE WHEN T.C1=S.C1 THEN 1
        ELSE 0 END) IS NULL)...;
``` thus, the scalar subquery returns one tuple, either a "1" or a null value for the case of an empty subquery.

Thus, the processing represented by the FIG. 5 processing of a universal subquery is to perform predicate pushdown processing (the FIG. 5 flow diagram box numbered 504) and then to transform the subquery to a scalar subquery (the flow diagram box numbered 506). These operations may be summarized as follows, beginning with a source universal query that has the form:

Universal Subquery Source

```
SELECT *
FROM T1 T
WHERE
    ...  (C1 relop ALL (SELECT C1
```

-continued

Universal Subquery Source

FROM T2 S
    WHERE T.C2=S.C2)). . .;

where "relop" is a relational operator, such as EQUAL, NOT EQUAL, LESS THAN, GREATER THAN, LESS THAN/ EQUAL, GREATER THAN/EQUAL, where T1 and T2 represent database tables, and where C1 and C2 represent respective columns of those tables. After predicate pushdown, for the case of not nullable columns and for nullable columns, respectively, the converted query looks like:

Converted Universal Query After Predicate Push-Down (Not Nullable)

SELECT *
    FROM T1 T
    WHERE
    . . . (NOT EXISTS (SELECT 1
        FROM T2 S
        WHERE T.C2=S.C2 AND
        NOT(T.C1 relop S.C1))) . . .;

for the not nullable case, and for the nullable case:

Converted Universal Query After Predicate Push-Down (Nullable)

SELECT *
    FROM T1 T
    WHERE
    . . . (NOT EXISTS (SELECT 1
        FROM T2 S
        WHERE T.C2=S.C2 AND
        0=CASE WHEN T.C1 relop S.C1 THEN 1
            ELSE 0 END)) . . .;

where such transformations are correct regardless of whether or not the subquery is correlated and regardless of the correlation predicates. The pushed subquery condition can help to eliminate rows that are returned to the main query. Furthermore, the subquery will not return any column values, and instead will return a row identifier or other indicator for each row returned. This is especially advantageous in a system having an MPP-shared nothing environment, because in such systems there is less communication among processors during evaluation of the subquery.

After the predicate push-down, the converted nullable query is transformed to a scalar subquery, as follows:

Converted Universal Query After Scalar Subquery Transformation (nullable)

SELECT *
    FROM T1 T
    WHERE
    . . . ((SELECT DISTINCT 1
        FROM T2 S
        WHERE T.C2=S.C2 AND
        0=CASE WHEN T.C1 relop S.C1 THEN 1
            ELSE 0 END) IS NULL) . . .;

and the subquery will return exactly one tuple, either "1" or the null value in the case of an empty subquery. As with the case of the existential query transformation, the SQL optimizer will have the option of where to send the respective tables, and will make its selection based on which will provide the greater efficiency.

Similarly, after the predicate push-down, the converted not nullable query is transformed to a scalar subquery, as follows:

Converted Universal Query After Scalar Subquery Transformation (not nullable)

SELECT *
    FROM T1 T
    WHERE
    . . . (SELECT DISTINCT 1
        FROM T2 S
        WHERE T.C2=S.C2 AND
        NOT (T.C1 relop S.CI)) IS NULL . . . ;

Again, as with the case of the existential query transformation, the SQL optimizer will have the option of where to send the respective tables, and will make its selection based on which will provide the greater efficiency.

ADVANTAGES OF THE INVENTION

Using the transformations described above, subqueries can be converted to scalar subqueries, thereby taking advantage of processing algorithms for scalar subqueries and permitting upper tables to be sent to nodes of lower tables and vice versa, and thereby permitting selection of the node direction depending on the least cost alternative. Thus, a relational data base management system constructed in accordance with the present invention includes a query processor that permits consideration of alternative query plans by the query optimizer so one table can be sent to a selected network location for subquery evaluation in consideration of maximum processing efficiency. The optimizer of the query processor is presented with rewritten query that permits more than one alternative for sending tables for evaluation. The optimizer evaluates the alternatives permitted by the rewritten code, determines the optimal plan for each alternative, and selects the least-cost plan from among the plans evaluated. Thus, the optimizer can decide to send an outer table to where a subquery table is located, or can decide to send a subquery table to where an outer table is located, depending on which is more efficient.

The present invention has been described above in terms of presently preferred embodiments so that an understanding of the present invention can be conveyed. There are, however, many configurations for SQL-processing relational data base management systems not specifically described herein but with which the present invention is applicable. The present invention should therefore not be seen as limited to the particular embodiments described herein, but rather, it should be understood that the present invention has wide applicability with respect to SQL-processing relational data base management systems generally. All modifications, variations, or equivalent arrangements and implementations that are within the scope of the attached claims should therefore be considered within the scope of the invention.

We claim:

1. A method of optimizing a query in a relational database management system that operates in a computer network and processes the query to retrieve data from computer storage, the method comprising the steps of:

receiving a query containing a subquery such that one or more columns of the tables in the query are compared with one or more columns of the tables in the subquery, wherein the tables in the query are partitioned on a first set of nodes of the computer network and the tables in the subquery are partitioned on a second set of nodes of the computer network;

rewriting the received query into an equivalent query such that the rewritten query allows performing the comparison of table columns at either the first set of nodes or the second set of nodes;

evaluating the resource cost of performing the table comparison at the first set of nodes or the second set of nodes; and selecting and generating a query plan for the selected rewritten query according to which has the lesser resource cost.

2. A method as defined in claim 1, wherein the step of rewriting the received query comprises the steps of:

pushing down the subquery predicate into the subquery; and transforming the subquery into a scalar subquery.

3. A method as defined in claim 2, wherein the subquery comprises an existential subquery.

4. A method as defined in claim 3, wherein the relational database management system receives queries and the step of transforming the subquery comprises the steps of:

pushing down the subquery predicate into the subquery, thereby forming an "EXISTS" subquery; and forming a scalar subquery returning at most one non-null value.

5. A method as defined in claim 4, wherein the step of forming a scalar subquery returning at most one non-null value comprises the steps of:

forming a "SELECT" clause involving only a single non-null value and a "DISTINCT" operator, which removes all duplicates of the non-null value; and transforming the "EXISTS" operator into a comparison operator such that whenever a non-null value is returned from the scalar subquery, the comparison operator becomes true, and the comparison operator otherwise becomes false.

6. A method as defined in claim 5, wherein the step of transforming comprises the step of forming an equal operator comparing the same non-null value used in the scalar subquery against the value returning from the scalar subquery.

7. A method as defined in claim 2, wherein the subquery comprises a universal subquery in which neither the compared table columns in the main query nor the compared subquery table columns are nullable.

8. A method as defined in claim 7, wherein the relational database management system receives queries and the step of transforming the subquery comprises the steps of:

pushing down the subquery predicate forming an "NOT EXISTS" subquery; and forming a scalar subquery returning at most one non-null value.

9. A method as defined in claim 8, wherein the step of forming a scalar subquery returning at most one non-null value comprises the steps of:

forming a "SELECT" clause involving only a single non-null value and a "DISTINCT" operator, which removes all duplicates of the non-null value; and transforming the "NOT EXISTS" operator into a comparison operator such that whenever a null value is returned from the scalar subquery, the comparison operator becomes true, and the comparison operator otherwise becomes false.

10. A method as defined in claim 9, wherein the step of transforming comprises the step of forming an "IS NULL" predicate involving the scalar subquery.

11. A method as defined in claim 2, wherein the subquery comprises a universal subquery in which at least one of the compared table columns in the main query or in the compared subquery table columns are nullable.

12. A method as defined in claim 11, wherein the relational database management system receives queries and the step of transforming the subquery comprises the steps of:

pushing down the subquery predicate forming an "NOT EXISTS" subquery containing a "CASE" expression; and forming a scalar subquery returning at most one non-null value.

13. A method as defined in claim 12, wherein the step of forming a scalar subquery returning at most one non-null value comprises the step of:

forming a "SELECT" clause involving only a single non-null value and a "DISTINCT" operator, which removes all duplicates of the non-null value; and transforming the "NOT EXISTS" operator into a comparison operator such that whenever a null value is returned from the scalar subquery, the comparison operator becomes true, and the comparison operator otherwise becomes false.

14. A method as defined in claim 13, wherein the step of transforming comprises the step of forming an "IS NULL" predicate involving the scalar subquery.

15. A method as defined in claim 2, wherein the subquery comprises an "EXISTS" subquery.

16. A method as defined in claim 15, wherein the relational database management system receives queries and step of transforming the subquery comprises the step of forming a scalar subquery returning at most one non-null value.

17. A method as defined in claim 16, wherein the step of forming a scalar subquery returning at most one non-null value comprises the step of:

forming a "SELECT" clause involving only a single non-null value and a "DISTINCT" operator, which removes all duplicates of the non-null value; and transforming the "EXISTS" operator into a comparison operator such that whenever a non-null data value is returned from the scalar subquery, the comparison operator becomes true, and the comparison operator otherwise becomes false.

18. A method as defined in claim 17, wherein the step of transforming comprises the step of forming an equal operator comparing the same non-null value used in the scalar subquery against the value returning from the scalar subquery.

19. A method as defined in claim 2, wherein the subquery comprises an "NOT EXISTS" subquery.

20. A method as defined in claim 19, wherein the relational database management system receives queries and step of transforming into the scalar subquery comprises the step of forming a scalar subquery returning at most one non-null value.

21. A method as defined in claim 20, wherein the step of forming a scalar subquery returning at most one non-null value comprises the steps of:

forming a "SELECT" clause involving only a single non-null value and a "DISTINCT" operator, which removes all duplicates of the non-null value; and transforming the "NOT EXISTS" operator into a comparison operator such that whenever a null value is returned from the scalar subquery, the comparison operator becomes true, and the comparison operator otherwise becomes false.

22. A method as defined in claim 21, wherein the step of transforming comprises the step of forming an equal operator comparing the same non-null value used in the scalar subquery against the value returning from the scalar subquery.

23. A method as defined in claim 1, wherein the step of rewriting the received query comprises the steps of:

rewriting the received query into an equivalent query such that the rewritten query allows the subquery to return only one acknowledgment of a match even in the presence of multiple matches; and generating a query plan for the rewritten query and estimating the resource cost, wherein the plan will be considered as an alternative by the processor.

24. A method as defined in claim 23, wherein the step of rewriting the received query comprises the steps of pushing down the subquery predicate into the subquery.

25. A method as defined in claim 24, wherein the subquery comprises an existential subquery.

26. A method as defined in claim 25, wherein the relational database management system receives queries and step of pushing comprises the steps of forming an EXISTS subquery, and allowing generation of a plan in which the subquery can return only one acknowledgment for multiple matches.

27. A method as defined in claim 24, wherein the subquery comprises a universal subquery.

28. A method as defined in claim 27, wherein the relational database management system receives queries and step of pushing comprises the steps of forming a NOT EXISTS subquery, and allowing generation of a plan in which the subquery can return only one acknowledgment for multiple matches.

29. A method as defined in claim 1, wherein:

the received query contains an EXISTS subquery such that one or more columns of the tables in the query are compared with one or more columns of the tables in the subquery, and wherein the tables in the query are partitioned on the first set of nodes of the computer network and the tables in the subquery are partitioned on the second set of nodes of the computer network; and the step of selecting and generating comprises:
generating a query plan for the query such that the subquery can return only one acknowledgment of a match even in presence of multiple matches; and
estimating the resource cost of the generated plan, wherein the plan will be considered as an alternative by the query processor.

30. A method as defined in claim 1, wherein:

the received query contains a NOT EXISTS subquery such that one or more columns of the tables in the query are compared with one or more columns of the tables in the subquery, and wherein the tables in the query are partitioned on the first set of nodes of the computer network and the tables in the subquery are partitioned on the second set of nodes of the computer network; and the step of selecting and generating comprises:
generating a query plan for the query such that the subquery can return only one acknowledgment of a match even in presence of multiple matches; and
estimating the resource cost of the generated plan, wherein the plan will be considered as an alternative by the query processor.

31. A relational database management system comprising:

a central processing unit at a first node of a computer network; and a query processor that receives relational queries at the first node and optimizes them to retrieve data from the data storage devices, wherein the query processor performs optimization by receiving a query containing a subquery such that one or more columns of a first table are compared with one or more columns of the tables in the subquery, wherein the tables in the query are partitioned on a first set of nodes of the computer network and the tables in the subquery are partitioned on a second set of nodes of the computer network; rewriting the received query into an equivalent query such that the rewritten query allows performing the table comparison at either the first set of nodes or the second set of nodes; evaluating the resource cost of performing the table comparison at the first set of nodes or the second set of nodes; and selecting and generating a query plan for the selected rewritten query according to which has the lesser resource cost.

32. A system as defined in claim 31, wherein the query processor rewrites the received query by pushing down the subquery pre dicate into the subquery and transforming the subquery into a scalar subquery.

33. A system as defined in claim 32, wherein the subquery comprises an existential subquery.

34. A system as defined in claim 33, wherein the relational database managementsystem receives queries and the query processor forms the scalar subquery by pushing down the subquery predicate forming an "EXISTS" subquery and forming a scalar subquery returning at most one non-null value.

35. A system as defined in claim 34, wherein the query processor forms a scalar subquery that returns at most one non-null value by forming a "SELECT" clause involving only a single non-null value and a "DISTINCT" operator, which removes all duplicates of the non-null value, and transforming the "EXISTS" operator into a comparison operator such that whenever a non-null value is returned from the scalar subquery, the comparison operator becomes true, and the comparison operator otherwise becomes false.

36. A system as defined in claim 35, wherein the query processor transforms the subquery by forming an equal operator comparing the same non-null value used in the scalar subquery against the value returning from the scalar subquery.

37. A system as defined in claim 32, wherein the subquery comprises a universal subquery in which neither the compared table columns in the main query nor the compared subquery table columns are nullable.

38. A system as defined in claim 37, wherein the relational database management system receives queries and the query processor transforms the subquery into the scalar subquery by pushing down the subquery predicate forming a "NOT EXISTS" subquery and forming a scalar subquery returning at most one non-null value.

39. A system as defined in claim 38, wherein the query processor forms a scalar subquery returning at most one non-null value by forming a "SELECT" clause involving only a single non-null value and a "DISTINCT" operator, which removes all duplicates of the non-null value, and transforming the "NOT EXISTS" operator into a comparison operator such that whenever a null value is returned from the scalar subquery, the comparison operator becomes true, and the comparison operator otherwise becomes false.

40. A system as defined in claim 39, wherein the query processor transforms by forming an "IS NULL" predicate involving the scalar subquery.

41. A system as defined in claim 32, wherein the subquery comprises a universal subquery in which at least one of the compared table columns in the main query or in the compared subquery table columns are nullable.

42. A system as defined in claim 41, wherein the relational database management system receives queries and the query processor transforms the subquery by pushing down the subquery predicate forming an "NOT EXISTS" subquery containing a "CASE" expression and forming a scalar subquery returning at most one non-null value.

43. A system as defined in claim 42, wherein the query processor forms a scalar subquery returning at most one non-null value by forming a "SELECT" clause involving only a single non-null value and a "DISTINCT" operator, which removes all duplicates of the non-null value and transforming the "NOT EXISTS" operator into a comparison operator such that whenever a null value is returned from the scalar subquery, the comparison operator becomes true, and the comparison operator otherwise becomes false.

44. A system as defined in claim 43, wherein the query processor transforms by forming an "IS NULL" predicate involving the scalar subquery.

45. A system as defined in claim 32, wherein the subquery comprises an "EXISTS" subquery.

46. A system as defined in claim 45, wherein the relational database management system receives queries and transforms the subquery into the scalar subquery by forming a scalar subquery returning at most one non-null value.

47. A system as defined in claim 46, wherein the query processor forms a scalar subquery returning at most one non-null value by forming a "SELECT" clause involving only a single non-null value and a "DISTINCT" operator, which removes all duplicates of the non-null value, and transforming the EXISTS operator into a comparison operator such that whenever a non-null data value is returned from the scalar subquery, the comparison operator becomes true, and the comparison operator otherwise becomes false.

48. A system as defined in claim 47, wherein the query processor transforms by forming an equal operator comparing the same non-null value used in the scalar subquery against the value returning from the scalar subquery.

49. A system as defined in claim 32, wherein the subquery comprises a "NOT EXISTS" subquery.

50. A system as defined in claim 49, wherein the relational database management system receives queries and the query processor transforms the subquery into the scalar subquery by forming a scalar subquery returning at most one non-null value.

51. A system as defined in claim 50, wherein the query processor forms a scalar subquery returning at most one non-null value by forming a "SELECT" clause involving only a single non-null value and a "DISTINCT" operator, which removes all duplicates of the non-null value, and transforming the "NOT EXISTS" operator into a comparison operator such that whenever a null value is returned from the scalar subquery, the comparison operator becomes true, and the comparison operator otherwise becomes false.

52. A system as defined in claim 51, wherein the query processor transforms by forming an equal operator comparing the same non-null value used in the scalar subquery against the value returning from the scalar subquery.

53. A system as defined in claim 31, wherein the query processor rewrites the received query by rewriting the received query into an equivalent query such that the rewritten query allows the subquery to return only one acknowledgment of a match even in presence of multiple matches, and generating a query plan for the rewritten query and estimating the resource cost, wherein the plan will be considered as an alternative by the query processor.

54. A system as defined in claim 53, wherein the query processor rewrites the received query by pushing down the subquery predicate into the subquery.

55. A system as defined in claim 54, wherein the subquery comprises an existential subquery.

56. A method as defined in claim 55, wherein the relational database management system receives queries and step of pushing comprises the steps of forming an EXISTS subquery, and allowing generation of a plan in which the subquery can return only one acknowledgment for multiple matches.

57. A method as defined in claim 54, wherein the subquery comprises a universal subquery.

58. A method as defined in claim 57, wherein the relational database management system receives queries and step of pushing comprises the steps of forming a NOT EXISTS subquery, and allowing generation of a plan in which the subquery can return only one acknowledgment for multiple matches.

59. A method as defined in claim 31, wherein:

the received query contains an EXISTS subquery such that one or more columns of the tables in the query are compared with one or more columns of the tables in the subquery, and wherein the tables in the query are partitioned on the first set of nodes of the computer network and the tables in the subquery are partitioned on the second set of nodes of the computer network; and the step of selecting and generating comprises:
generating a query plan for the query such that the subquery can return only one acknowledgment of a match even in presence of multiple matches; and
estimating the resource cost of the generated plan, wherein the plan will be considered as an alternative by the optimizer.

60. A system as defined in claim 31, wherein:

the received query contains a NOT EXISTS subquery such that one or more columns of the tables in the query are compared with one or more columns of the tables in the subquery, and wherein the tables in the query are partitioned on the first set of nodes of the computer network and the tables in the subquery are partitioned on the second set of nodes of the computer network; and the step of selecting and generating comprises:
generating a query plan for the query such that the subquery can return only one acknowledgment of a match even in presence of multiple matches; and
estimating the resource cost of the generated plan, wherein the plan will be considered as an alternative by the optimizer.

61. A program product data storage device, tangibly embodying a program of machine-readable instructions executable by a computer system connected to a computer network, the program product comprising:

a recordable media;

a relational data base management system (RDBMS) recorded on the recordable media, the RDBMS having a query processor that executes steps of receiving a query containing subquery such that one or more columns of the tables in the query are compared with one or more columns of the tables in the subquery, wherein the tables in the query are partitioned on a first set of nodes of the computer network and the tables in the subquery are partitioned on a second set of nodes of the computer network;

rewriting the received query into an equivalent query such that the rewritten query allows performing the table comparison at either the first set of nodes or the second set of nodes;

evaluating the resource cost of performing the table comparison at the first set of nodes or the second set of nodes; and selecting and generating a query plan for the selected rewritten query according to which has the lesser resource cost.

62. A program product as defined in claim 61, wherein the query processor rewrites the received query by pushing down the subquery predicate into the subquery and transforming the subquery into a scalar subquery.

63. A program product as defined in claim 62, wherein the subquery comprises an existential subquery.

64. A program product as defined in claim 63, wherein the relational database management system receives queries and the query processor transforms the subquery into the scalar subquery by pushing down the subquery predicate forming an "EXISTS" subquery and forming a scalar subquery returning at most one non-null value.

65. A program product as defined in claim 64, wherein the query processor forms a scalar subquery returning at most one non-null value by forming a "SELECT" clause involving only a single non-null value and a "DISTINCT" operator, which removes all duplicates of the non-null value, and transforming the "EXISTS" operator into a comparison operator such that whenever a non-null value is returned from the scalar subquery, the comparison operator becomes true, and the comparison operator otherwise becomes false.

66. A program product as defined in claim 65, wherein the query processor transforms by forming an equal operator comparing the same non-null value used in the scalar subquery against the value returning from the scalar subquery.

67. A program product as defined in claim 62, wherein the subquery comprises a universal subquery in which neither the compared table columns in the main query nor the compared subquery table columns are nullable.

68. A program product as defined in claim 67, wherein the relational database management system receives queries and the query processor transforms the subquery into the scalar subquery by pushing down the subquery predicate forming an "NOT EXISTS" subquery and forming a scalar subquery returning at most one non-null value.

69. A program product as defined in claim 68, wherein the query processor forms a scalar subquery returning at most one non-null value by forming a "SELECT" clause involving only a single non-null value and a "DISTINCT" operator, which removes all duplicates of the non-null value and transforming the "NOT EXISTS" operator into a comparison operator such that whenever a null value is returned from the scalar subquery, the comparison operator becomes true, and the comparison operator otherwise becomes false.

70. A program product as defined in claim 69, wherein the query processor transforms by forming an IS NULL predicate involving the scalar subquery.

71. A program product as defined in claim 62, wherein the subquery comprises a universal subquery in which at least one of the compared table columns in the main query or the compared subquery table columns are nullable.

72. A program product as defined in claim 71, wherein the relational database management system receives queries and the query processor transforms the subquery into the scalar subquery by pushing down the subquery predicate forming an "NOT EXISTS" subquery containing a "CASE" expression and forming a scalar subquery returning at most one non-null value.

73. A program product as defined in claim 72, wherein the query processor forms a scalar subquery returning at most one non-null value by forming a "SELECT" clause involving only a single non-null value and a "DISTINCT" operator, which removes all duplicates of the non-null value and transforming the "NOT EXISTS" operator into a comparison operator such that whenever a null value is returned from the scalar subquery, the comparison operator becomes true, and the comparison operator otherwise becomes false.

74. A program product as defined in claim 73, wherein the query processor transforms by forming an "IS NULL," predicate involving the scalar subquery.

75. A program product as defined in claim 62, wherein the subquery comprises an "EXISTS" subquery.

76. A program product as defined in claim 75, wherein the relational database management system receives queries and the query processor transforms the subquery into the scalar subquery by forming a scalar subquery returning at most one non-null value.

77. A program product as defined in claim 76, wherein the query processor forms a scalar subquery returning at most one non-null value by forming a "SELECT" clause involving only a single non-null value and a "DISTINCT" operator, which removes all duplicates of the non-null value and transforming the "EXISTS" operator into a comparison operator such that whenever a non-null data value is returned from the scalar subquery, the comparison operator becomes true, and the comparison operator otherwise becomes false.

78. A program product as defined in claim 77, wherein the query processor transforms by forming an equal operator comparing the same non-null value used in the scalar subquery against the value returning from the scalar subquery.

79. A program product as defined in claim 62, wherein the subquery comprises an "NOT EXISTS" subquery.

80. A program product as defined in claim 79, wherein the relational database management system receives queries and the query processor transforms the subquery into the scalar subquery by forming a scalar subquery returning at most one non-null value.

81. A program product as defined in claim 80, wherein the query processor forms a scalar subquery returning at most one non-null value by forming a "SELECT" clause involving only a single non-null value and a "DISTINCT" operator, which removes all duplicates of the non-null value and transforming the "NOT EXISTS" operator into a comparison operator such that whenever a null value is returned from the scalar subquery, the comparison operator becomes true, and the comparison operator otherwise becomes false.

82. A program product as defined in claim 81, wherein the query processor transforms by forming an equal operator comparing the same non-null value used in the scalar subquery against the value returning from the scalar subquery.

83. A program product as defined in claim 61, wherein the query processor rewrites the received query by rewriting the received query into an equivalent query such that the rewritten query allows the subquery to return only one acknowledgment of a match even in presence of multiple matches, and generating a query plan for the rewritten query and estimating the resource cost, wherein the plan will be considered as an alternative by the query processor.

84. A program product as defined in claim 83, wherein the query processor rewrites the received query by pushing down the subquery predicate into the subquery.

85. A program product as defined in claim 84, wherein the subquery comprises an existential subquery.

86. A program product as defined in claim 85, wherein the relational database management system receives queries and step of pushing comprises the steps of forming an EXISTS subquery, and allowing generation of a plan in which the subquery can return only one acknowledgment for multiple matches.

87. A method as defined in claim 84, wherein the subquery comprises a universal subquery.

88. A method as defined in claim 87, wherein the relational database management system receives queries and step of pushing comprises the steps of forming a NOT EXISTS subquery, and allowing generation of a plan in which the subquery can return only one acknowledgment for multiple matches.

89. A method as defined in claim 61, wherein:

the received query contains an EXISTS subquery such that one or more columns of the tables in the query are compared with one or more columns of the tables in the subquery, and wherein the tables in the query are partitioned on the first set of nodes of the computer network and the tables in the subquery are partitioned on the second set of nodes of the computer network; and the step of selecting and generating comprises:
generating a query plan for the query such that the subquery can return only one acknowledgment of a match even in presence of multiple matches; and
estimating the resource cost of the generated plan, wherein the plan will be considered as an alternative by the optimizer.

90. A program product as defined in claim 61, wherein:

the received query contains a NOT EXISTS subquery such that one or more columns of the tables in the query are compared with one or more columns of the tables in the subquery, and wherein the tables in the query are partitioned on the first set of nodes of the computer network and the tables in the subquery are partitioned on the second set of nodes of the computer network; and the step of selecting and generating comprises:
generating a query plan for the query such that the subquery can return only one acknowledgment of a match even in presence of multiple matches; and
estimating the resource cost of the generated plan, wherein the plan will be considered as an alternative by the optimizer.

* * * * *

UNITED STATES PATENT AND TRADEMARK OFFICE
CERTIFICATE OF CORRECTION

PATENT NO. :    5,864,840
DATED      :    January 26, 1999
INVENTOR(S) :   Leung, et al It is certified that error appears in the above-indentified patent and that said Letters Patent is hereby corrected as shown below:

Column 20, lines 8, 14, 16, and 22, change "A method" to --A system--.

Signed and Sealed this

First Day of February, 2000

Attest:

Attesting Officer

Q. TODD DICKINSON

Acting Commissioner of Patents and Trademarks